Oct. 28, 1930. S. R. OLDHAM 1,779,750
REMOVABLE SWIVEL TIP FOR VALVE STEMS
Filed Jan. 31, 1929 2 Sheets-Sheet 1
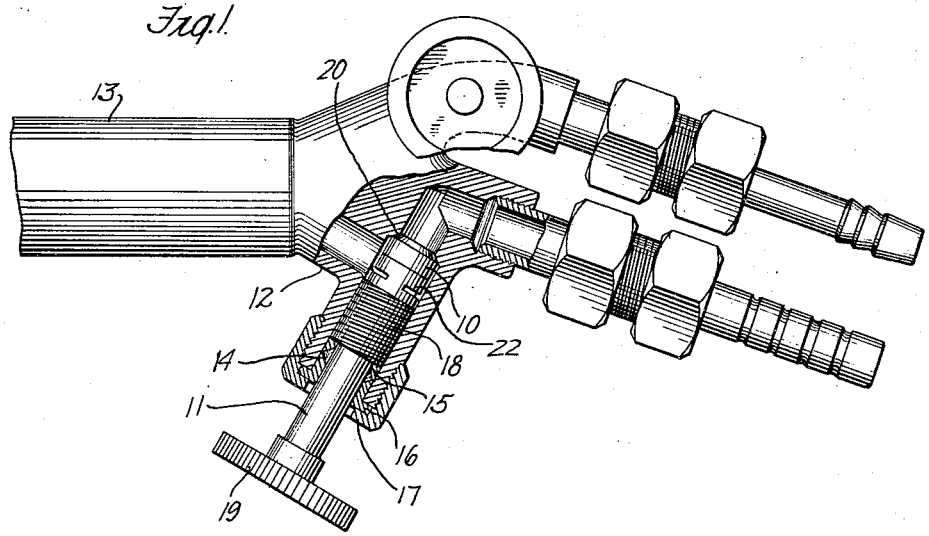
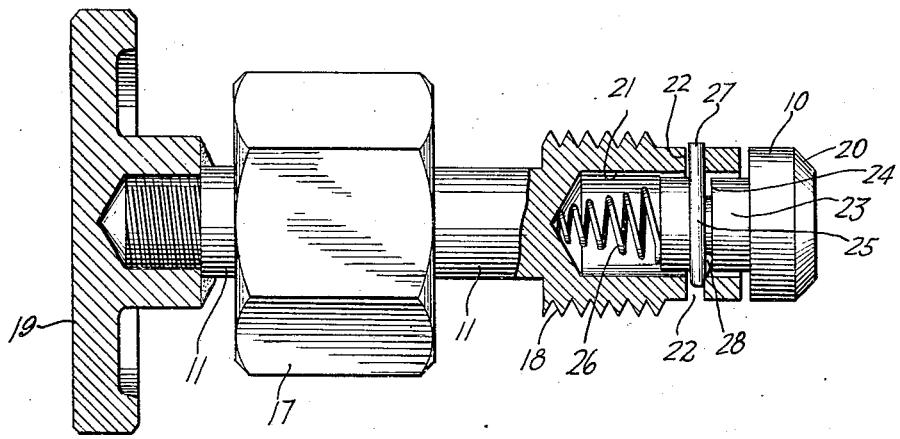
Samuel R. Oldham, INVENTOR,
BY
Byrnes Townsend & Brickenstein, ATTORNEYS.

Oct. 28, 1930.  S. R. OLDHAM  1,779,750
REMOVABLE SWIVEL TIP FOR VALVE STEMS
Filed Jan. 31, 1929   2 Sheets-Sheet 2
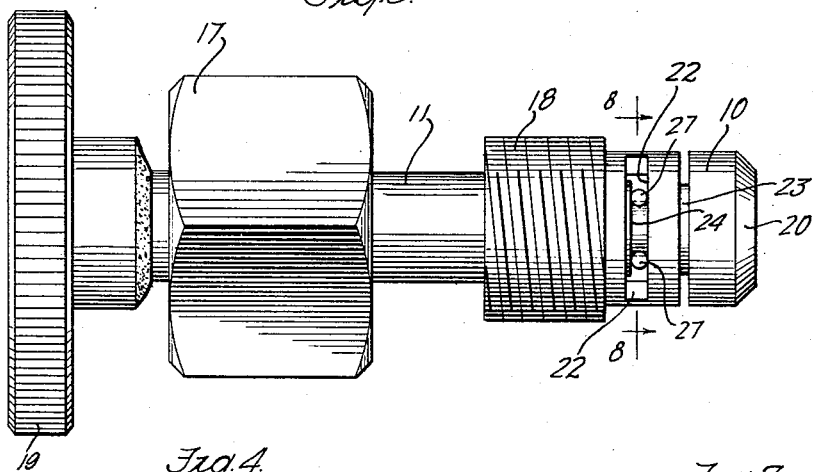
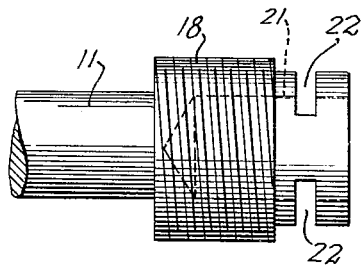
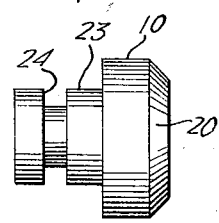
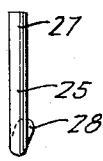
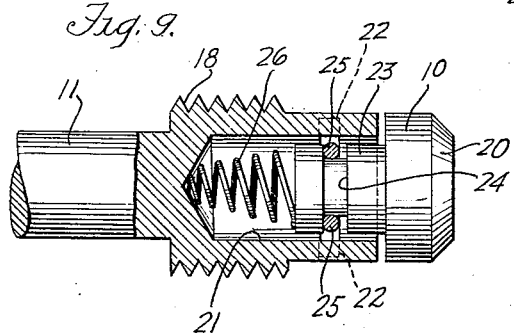
Samuel R. Oldham, INVENTOR,
BY
Byrnes, Townsend & Brickenstein, ATTORNEYS.

Patented Oct. 28, 1930

1,779,750

UNITED STATES PATENT OFFICE

SAMUEL R. OLDHAM, OF CHICAGO, ILLINOIS, ASSIGNOR TO OXWELD RAILROAD SERVICE COMPANY, A CORPORATION OF DELAWARE

REMOVABLE SWIVEL TIP FOR VALVE STEMS

Application filed January 31, 1929. Serial No. 336,515.

This invention pertains to valves for controlling the flow of fluids and more specifically to a stem for such valves having a floating removable tip.

It is customary to incorporate valves in the body of a blowpipe to control the volume of the gases used thereby, and such valves usually have a unitary stem and tip. These valves frequently leak after they have been in use a short time due to wear caused by a slight eccentricity existing between the tip of the valve stem and the valve seat. This eccentricity causes one side of the tip and one side of the seat to wear faster than the rest of the seating surfaces so, in a short time, the valve leaks through these worn places. When the valve begins to leak the operator naturally closes it tighter to stop it from leaking and this extra pressure and friction often scores the seating surfaces thereby causing further leakage that usually renders the valve useless so it must be repaired or replaced at considerable inconvenience and expense.

One object of the present invention is to provide a valve with a stem having a floating tip that will align itself with the valve seat as the valve is closed, without causing undue wear on any portion of the seating surfaces, so the valve will close more easily and give more service without leaking. Another object of the invention is to provide a valve with a stem having a floating tip that reduces relative motion between the seating surfaces and eliminates the liability of their becoming scored when the valve is closed with considerable force. Another object of the invention is to provide a valve with a stem having a floating tip that is under spring tension so the tip will not chatter when the valve is in a nearly closed position. Another object of the invention is to provide a means for securing a floating tip to a valve stem so it will remain attached during shipment, storage, and use, but may be readily detached for repair or replacement when desirable. Other aims, objects, and novel features, will be apparent from the drawing and the following description.

The objects of this invention are attained by the mechanism shown in the accompanying drawing, in which:

Fig. 1 is a longitudinal section of a portion of a blowpipe having a valve built therein embodying my invention;

Fig. 2 is an enlarged side view of the valve stem of Fig. 1 partially in section to show the relation of the component parts;

Fig. 3 is an enlarged side view of the valve stem of Fig. 2 showing the assembled position of the staple that secures the tip to the stem;

Fig. 4 is an enlarged side view of the inner end of the valve stem of Fig. 3 showing the position of the slots that receive the staple;

Fig. 5 is an enlarged side view of the staple that secures the tip to the stem;

Fig. 6 is an enlarged side view of the spring that prevents the tip from chattering;

Fig. 7 is an enlarged side view of the floating removable tip;

Fig. 8 is a view along the line 8—8 of Fig. 3 looking in the direction of the arrows, and;

Fig. 9 is an enlarged longitudinal section of the end of the valve stem with the tip, spring, and staple in assembled position.

One embodiment of the invention, shown in Fig. 1, may comprise a floating tip 10 attached to a valve stem 11 and carried by a rear body casting 12 that forms a valve body and also part of a blowpipe 13. Leakage past the valve stem 11 may be prevented by a packing 14 that fills the space between the stem 11 and the valve body 12 and is compressed between a stem stop ring 15 and a gland 16 by means of a gland nut 17 that is threaded to the outside of the valve body 12. An enlargement 18 of the valve stem 11 is threaded in the valve body 12, and the valve may be opened and closed by screwing the stem 11 back and forth in the valve body 12 by means of the handle 19 attached to the outer end of the valve stem 11. When the valve is closed the beveled end 20 of the tip 10 is seated on a similarly beveled surface in the valve body 12, and these seating surfaces are accurately formed and matched so no gas escapes between them when the valve is in closed position and one is seated on the other.

The valve stem 11, shown more clearly in Figs. 2 to 9, may have a socket or recess 21 in the inner end thereof and transverse slots 22 extending through opposite sides of the wall of the socket. The tip 10 may be substantially the size of the inner end of the valve stem 11 and have a reduced portion 23 extending into the socket 21, with an annular groove 24 in said reduced portion 23 opposite the slots 22 in the wall of the socket 21. The tip 10 may be secured in the socket 21 by a staple 25 that is held in the slots 22 and the groove 24. A spring 26 may be held in a partially compressed condition between the inner end of the reduced portion 23 of the tip 10 and the bottom of the socket 21.

The reduced portion 23 of the tip 10 is somewhat smaller in diameter than the socket 21 in which it is held so the tip may float or move sidewise enough to allow the seating surface 20 of the tip to seat squarely on the seating surface of the valve body 12 without bending or straining the valve stem 11. This construction that allows the tip to move laterally and align itself with the valve seat prevents the misalignment that usually exists in the valve stem from causing one portion of the seating surfaces to wear faster than the rest and produce a leaky valve. This feature greatly reduces the wear on the seating surfaces of the valve and, consequently, greatly increases its useful life.

In addition to being able to float in the stem, the tip 10 may also rotate in the stem 11. When the valve is closed, more especially with considerable pressure, the tapering seating surfaces wedge together so the friction between these surfaces is greater than between the tip 10 and the valve stem 11. Consequently, the relative rotary movement between the valve stem 11 and the valve body 12 takes place between the valve stem 11 and the tip 10, instead of between the accurately fitted seating surfaces as in ordinary valves. This construction by which the relative rotary movement is removed from the seating surfaces prevents them from becoming scored when the valve is closed with considerable pressure and, therefore, prolongs the useful life of the valve and eliminates much of the need for frequently refinishing the seating surfaces.

In small valves having an integral valve stem and tip that closes against a seat in an integral valve body, considerable difficulty is experienced in constructing them so they do not leak slightly. In large valves, the threaded portion of the valve body is removable so an abrasive may be placed between the seating surfaces and one may be rotated upon the other until they are ground together so they do not leak. In small valves having an integral tip this grinding operation is impossible, but in valves such as shown and described herein the threaded portion of the valve stem may be removed from the tip so the seating surface 20 of the tip 10 may be rotated on the seating surface of the valve body 12 to grind them together the same as in larger valves. This feature makes it possible to more easily secure a tight valve and to more easily repair a leaking one, especially in the field, where the only means for repairing a leaking valve is to regrind the seating surfaces.

During the development of the valve shown and described herein, it was found that the floating tip frequently chattered when the valve was nearly closed, and it was also discovered that all chattering could be prevented by inserting a spring 26 between the valve stem 11 and the tip 10 so the tip was always under spring tension. This feature allows the valve to be opened a slight amount without the annoyance of having the gas flow move the tip and change the size of the opening, and the danger of having the tip chatter and roughen the seating surfaces so they leak.

In a valve stem having a floating removable tip it is desirable to secure the tip to the stem so it will remain attached during manufacture, shipment, and use; and at the same time, have it readily removable for repair and replacement. This is accomplished by forming the staple 25 so it may be manually inserted in the slots 22 and the groove 24; so it will remain in place; and so it may be manually removed. The arms 27 of the staple 25 are closer together at their outer ends than they are at the head of the staple where they are joined, and the space between the arms 27 is less than the diameter of the tip 10 at the bottom of the groove 24. Consequently, when the staple is in assembled position, the arms 27 grip the bottom of the groove 24 and tend to draw the head of the staple toward the groove. As long as the staple is not bent or mutilated it will remain in assembled position but, as it might become bent and fall out, an additional means for holding it in assembled position is provided.

The head of the staple 25 is provided with an inturned loop 28 that is bent sidewise just far enough to make the head of the staple slightly wider than either of the slots 22 through which it passes when it is inserted in assembled position. This inturned loop 28 serves the double function of making the head of the staple slightly wider than either of the slots 22, so the head of the stample must be sprung slightly when it is inserted or removed, thereby preventing it from becoming dislodged; and also, the inturned loop strikes against the bottom of the groove 24 and holds the head of the staple in one of the slots 22. If it were not for this inturned loop the head of the staple would pass through the slot and rest in the groove 24 so only the protruding ends 27 would be in the slots 22 and serve to hold the tip 10 in the socket 21. As it is, the inturned loop 28 holds the staple 25 so the head is in one of the slots 22; the free ends 27 are in the other slot 22; and the central portion of the staple is in the groove 24, thereby securely holding the tip 10 in the socket 21. This construction securely holds the component parts of the valve stem together without danger of any of the parts coming loose and falling out during storage and shipment, and still, the parts may be manually disassembled and reassembled whenever desirable without recourse to tools or mechanical devices of any kind. The head of the staple 25 is sprung only when the staple is being inserted or withdrawn. When the staple is in assembled position the inturned loop 28 lies inside the slot 22 and the head of the staple lies loosely in the slot 22 so the tip 10 may move sidewise in the socket 21 without having its movement restricted by the staple. The range of this lateral movement is sufficient to allow for any eccentricity that may exist in the valve stem so the tip may seat squarely on the valve seat as the valve is closed and thereby eliminate all side strain on the tip and all regional wear on the seating surfaces. Therefore, the valve may be closed more easily and it will give longer service before needing its parts repaired or replaced.

The materials of which the component parts of this novel valve are composed are well known in the art and form no part of the invention. It is understood, of course, that having the valve body part of a blowpipe is not essential as it may be formed independently. Various changes and alterations in the form of the component parts may be made and they may be assembled differently without departing from the invention or sacrificing any of the rights thereunder.

I claim:

1. In a valve, the combination of a stem having a socket in one end thereof and an opening through the side wall of said socket; a one piece tip having a reduced portion projecting into said socket and fitting loosely therein; a spring between the bottom of said socket and the inner end of said reduced portion; and means insertable and removable through said opening to fasten said tip in said socket.

2. In a valve, the combination of a stem having a socket in one end and transverse slots in opposite sides of said socket extending through the wall thereof; a tip having a reduced portion extending into said socket and fitting loosely therein and an annular groove in said reduced portion; a spring held in a partially compressed condition between the inner end of said reduced portion and the bottom of said socket; and means in said slots and said groove for holding said tip in said socket.

3. In a valve, the combination of a stem having a socket in one end and transverse slots in opposite sides of said socket extending through the wall thereof; a tip having a reduced portion fitting loosely in said socket and an annular groove in said reduced portion opposite said slots; and a staple insertable through said slots and said groove to secure said tip in said socket, and removable therefrom to release said tip from said socket; said staple having converging ends that grip the bottom of said groove and tend to hold said staple in its assembled position.

4. In a valve, the combination of a stem having a socket in one end and transverse slots in opposite sides of said socket extending through the wall thereof; a tip having a reduced portion fitting loosely in said socket and an annular groove in said reduced portion opposite said slots; a spring in a partially compressed condition between the bottom of said socket and the inner end of said reduced portion; and a staple insertable through said slots and said groove to secure said tip in said socket; said staple having an inturned loop that is offset to make the head of said staple slightly wider than either of said slots so the head of said staple must be sprung slightly as it is inserted and so said staple will remain inserted until manually removed.

In testimony whereof, I affix my signature.

SAMUEL R. OLDHAM.